(12) United States Patent
Ferencz et al.

(10) Patent No.: US 11,478,995 B2
(45) Date of Patent: Oct. 25, 2022

(54) PROCESS FOR THE PRODUCTION OF COMPOSITE MATERIALS AT LOW TEMPERATURES

(71) Applicant: Henkel AG & Co. KGaA, Duesseldorf (DE)

(72) Inventors: Andreas Ferencz, Duesseldorf (DE); Mike Wienand, Heidelberg (DE); Pascal Albrecht, Eppelheim (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 17/007,682

(22) Filed: Aug. 31, 2020

(65) Prior Publication Data
US 2020/0398501 A1    Dec. 24, 2020

Related U.S. Application Data

(63) Continuation of application No. PCT/EP2019/051913, filed on Jan. 25, 2019.

(30) Foreign Application Priority Data

Mar. 1, 2018   (EP) .................................... 18159451

(51) Int. Cl.
| | |
|---|---|
| *B29C 45/14* | (2006.01) |
| *B29C 67/24* | (2006.01) |
| *B29C 45/00* | (2006.01) |
| *B29C 70/48* | (2006.01) |
| *B29C 70/86* | (2006.01) |

(Continued)

(52) U.S. Cl.
CPC ........ *B29C 67/246* (2013.01); *B29C 45/0001* (2013.01); *B29C 45/14631* (2013.01); *B29C 45/14819* (2013.01); *B29C 70/48* (2013.01); *B29C 70/865* (2013.01); *B29K 2075/00* (2013.01); *B29K 2105/0094* (2013.01); *B29K 2715/003* (2013.01);
(Continued)

(58) Field of Classification Search
None
See application file for complete search history.

(56) References Cited

U.S. PATENT DOCUMENTS 3,177,280 A * 4/1965 Ford ...................... B29C 33/12
264/275
5,006,297 A * 4/1991 Brown ............... A63B 37/0003
264/234

(Continued)

FOREIGN PATENT DOCUMENTS

| CN | 104640894 A | 5/2015 |
| DE | 102014017809 A1 | 6/2016 |
| WO | 2013127732 A1 | 9/2013 |

OTHER PUBLICATIONS

International Search Report issued in connection with International Patent Application No. PCT/EP2019/051913 dated Mar. 28, 2019.

(Continued)

Primary Examiner — Edmund H Lee
(74) Attorney, Agent, or Firm — Mary K. Cameron

(57) ABSTRACT

A process for the production of composite materials at low temperatures, as well as a composite material obtained by the process and articles of manufacture comprising the composite material are provided.

10 Claims, 1 Drawing Sheet

(51) Int. Cl.
*B29K 75/00* (2006.01)
*B29K 105/00* (2006.01)
*B29L 31/30* (2006.01)

(52) U.S. Cl.
CPC ............... *B29K 2995/0063* (2013.01); *B29K 2995/0088* (2013.01); *B29L 2031/30* (2013.01)

(56) References Cited

U.S. PATENT DOCUMENTS

| | | | |
|---|---|---|---|
| 5,465,969 A | 11/1995 | Cadorniga | |
| 6,197,242 B1 | 3/2001 | Parks et al. | |
| 6,793,864 B1* | 9/2004 | Dewanjee | A63B 37/0003 |
| | | | 156/146 |
| 7,601,290 B2* | 10/2009 | Nagasawa | A63B 37/0023 |
| | | | 264/236 |
| 2002/0016435 A1* | 2/2002 | Simonutti | A63B 37/0023 |
| | | | 528/59 |
| 2002/0042310 A1* | 4/2002 | Iwami | C08G 18/10 |
| | | | 473/361 |
| 2002/0052251 A1* | 5/2002 | Iwami | C08G 18/10 |
| | | | 473/356 |
| 2002/0098914 A1* | 7/2002 | Calabria | A63B 37/0004 |
| | | | 473/354 |
| 2003/0166819 A1 | 9/2003 | Dewanjee et al. | |
| 2005/0130767 A1 | 6/2005 | Sullivan et al. | |
| 2005/0261084 A1* | 11/2005 | Sullivan | A63B 37/0003 |
| | | | 473/354 |
| 2006/0073914 A1* | 4/2006 | Sullivan | A63B 37/0003 |
| | | | 473/371 |
| 2010/0144465 A1* | 6/2010 | Sullivan | A63B 37/0076 |
| | | | 473/373 |
| 2011/0121805 A1 | 9/2011 | Sullivan et al. | |
| 2011/0218056 A1 | 9/2011 | Sullivan et al. | |
| 2012/0080824 A1 | 4/2012 | Sullivan et al. | |
| 2013/0104480 A1* | 5/2013 | Smith | B29C 39/10 |
| | | | 52/309.7 |
| 2017/0073454 A1 | 3/2017 | Ferencz et al. | |

OTHER PUBLICATIONS

Handbook of Composite Reinforcements (Editor: Suart M. Lee) Wifey-VCH 1993, Chapter Core Composites and Sandwich Structures, pp. 171-189.

B. Rikard Gebart et al, Chapter 12, "Principles of Liquid Composite Molding", pp. 358-387. Taken from Processing of Composites, edited by Raju S. Dave and Alfred C. Loos. Distributed in the USA and Canada by Hanser/Gardner Publications, Inc., Cincinnati, OH.

* cited by examiner

PROCESS FOR THE PRODUCTION OF COMPOSITE MATERIALS AT LOW TEMPERATURES

FIELD OF THE INVENTION

The present invention refers to a process for the production of composite materials at low temperatures as well as a composite material obtained by the inventive process.

A composite material is a material made from two or more constituent materials with significantly different physical or chemical properties that, when combined, produce a material with characteristics that differ from those of the individual components. However, the individual components remain separate and distinct in the finished structure. There are two main categories of constituent materials, the matrix and reinforcement. The matrix material surrounds and supports the reinforcement materials by maintaining their relative positions. The reinforcement materials impart their special mechanical and physical properties to enhance the matrix properties. A synergism produces material properties unavailable from the individual constituent materials, while the wide variety of matrix and strengthening materials allows the designer of the product or structure to choose the optimum combination.

BACKGROUND OF THE INVENTION

One of the earliest man-made composite materials was straw and mud combined to form bricks for building construction. Even now, one of the most common applications for composite materials is the field of construction with concrete being a popular example of an artificial composite material, typically consisting of loose stones (aggregate) held with a matrix of cement. Since then, the field of composite material has expanded to include, e.g. fiber-reinforced polymers (FRP), metal matrix composites (MMC) or ceramic matrix composites (CMC).

Sandwich-structured composite materials are a special class of composite materials that are fabricated by attaching two thin but stiff skins to a lightweight but thick core. The core material is normally a low strength material, but its higher thickness provides the sandwich composite with high bending stiffness by overall low density.

Many processes are known for the production of composite materials. Especially the process of high-pressure resin transfer molding (HP-RTM) has become the focus of attention. Generally, in those manufacturing processes, the casting material is forced into a mold. Especially for manufacturing high performance automotive composite parts, HP-RTM is a standard process. This process usually is conducted under high in-mold pressure and high mold temperatures to achieve a short curing time of the matrix material and thus realize a high through-put. The harsh conditions employed severely limit the materials, in particular the core materials which can be employed.

In light of the mechanical properties of the manufactured parts, it is desirable to use foam materials as the core material of the sandwich-structure composite material. However, due to the high pressure and high temperatures employed during HP-RTM, standard foams tend to collapse, leading to overfilled parts with neat resin areas or to parts with improper surface or both.

DE 10 2014 017 809 discloses a method for producing a structural component having a sandwich structure comprising a middle core layer and cover layers made of fiber-reinforced plastic, in which a preform is made from the middle core layer and double-layered products. The core layer is placed in a tool cavity of an injection tool and then encapsulated in an injection process under heat and injection pressure with a liquid starting component of a matrix material, wherein a first cover layer faces a tool-side sprue opening and is covered in the injection direction and a second cover layer is arranged on the side of the core layer remote from the sprue exit defining a flow channel through which the liquid matrix material flows.

So far, the known processes in the field suffer the drawbacks that only one of either combination can be realized. Either a fast cure resin can be employed but only in combination with expensive specialty foam cores or heavy-weight foam cores. Alternatively, a slow cure resin can be employed with low pressure injection in combination with standard foam cores. Therefore, the process is either very costly due to the required specialty foam cores or slow due to the slow cure resin.

SUMMARY OF THE INVENTION

It is therefore the object of the present invention to provide a process variant of HP-RTM which allows the combination of common processing foam cores having low pressure stability with a fast curing matrix material to achieve fast cycle times.

This object is solved by the process according to the invention which employs a low viscosity resin as injectable matrix material and allows for fast curing times even at low mold temperatures.

DETAILED DESCRIPTION OF PREFERRED EMBODIMENTS

Figure 1:
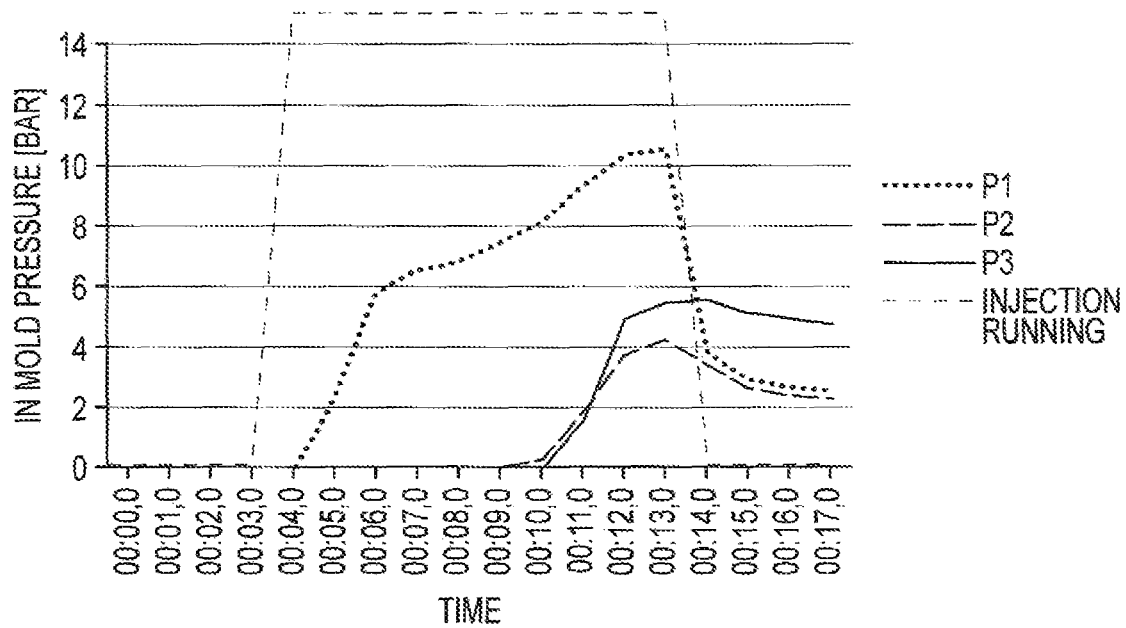
FIG. 1 shows a graph of in-mold pressure in bars versus time of a PET foam core material having a density of 110 g/l during processing according to an embodiment of the inventive process at a temperature of 68° C.

A first subject of the present invention is therefore a process for the production of a composite material wherein a core material is placed inside a mold; a liquid matrix material is inserted into the mold and cured, wherein curing of the matrix material is affected at a temperature of no more than 100° C.

It was surprisingly found that the low temperatures allow the use of foam core with low pressure resistance in the HP-RTM process. The inventive process further allows the combination of fast cure resins with standard foam cores with a low softening point and low density which so far could not be employed in common HP-RTM processes. For more rigid foams, it was surprisingly found that the inventive process allows a processing further removed from the softening point of the foam so that higher in mold pressure can be reached with the same foam material compared to common processes.

The inventive process is especially suitable for making lightweight structures due to the fact that the respective foam materials can be employed as core materials. Without being bound by theory, it is believed that this is due to the low temperatures at which curing of the matrix material is affected. In a preferred embodiment the curing of the matrix material is therefore affected at temperatures of 50° C. to no more than 100° C., preferably 60 to 80° C.

The temperature of the curing can be achieved by way of heating the mold cavity. In a preferred embodiment of the inventive process the temperature of the mold does not exceed 100° C. Especially preferred is an embodiment wherein the temperature inside the mold is no more than 100° C., preferably 50° C. to no more than 100° C., especially 60 to 80° C. Preferably, the temperature inside the mold does not exceed 100° C. during the whole production process.

It was surprisingly found that the inventive process allows for high in-mold pressures despite the low-density foam cores employed. The pressure inside the mold is needed to properly fill the mold and to cure the resin without bubbles or air entrapment. The best results were achieved when the pressure was in the range of 0.2 to 2.5 MPa. In a preferred embodiment of the present invention, the in-mold pressure is therefore 0.2 to 2.5 MPa, preferably 0.4 to 1.5 MPa.

The inventive process is especially suitable for the production of lightweight sandwich-structured composite materials comprising a core material. Preferably, the core material is a foam core material. In a further preferred embodiment, the core material is selected from the group consisting of polyethylene terephthalate foams, polyvinyl chloride foams and low-density polyurethane foams.

For most applications of sandwich-structured composite materials, the weight of the material is an essential feature which has to be taken into consideration. In most cases, especially in automotive applications, lightweight materials are preferred due to economic and ecological reasons. However, at the same time those materials should possess a suitable mechanical stability. One way to control the weight of a material is the density. In a preferred embodiment of the invention the core material has a density of 60 to 400 g/l, preferably 80 to 150 g/l. It was surprisingly found that the inventive process allows for the employment of such low-density materials without the usual disadvantage of collapse of the core material.

The inventive process employs a liquid matrix material which is inserted, preferably injected, into a mold. It was surprisingly found that the cycle time of the inventive process could be further improved by adjusting the viscosity of the matrix material. The matrix material employed in the inventive process preferably has a viscosity of 20 to 3000 mPas, preferably 100 to 1000 mPas, determined according to EN ISO 2555 at 20 to 40° C. It was found that the best results with respect to coverage of the core material and cycle time could be achieved if the viscosity of the matrix material was within the claimed range.

The matrix material employed in the inventive process is adapted to be injectable into the mold. Preferably, the liquid matrix material is injected into the mold at a speed of 15 to 200 g/s, preferably 20 to 80 g/s. It was surprisingly found that the requirements of fast cycle time and proper filling of the mold could both be met when the injection speed was within the claimed range.

In order to provide the desired cycle times, the matrix material has to be cured as fast as possible at a temperature that does not affect the core material. At the same time, proper filling of the mold and coverage of the core material has to be ensured. It was found that the best results could be achieved when the curing of the matrix material takes no longer than 600 s. In a preferred embodiment of the inventive process, the curing of the matrix material is carried out within 20 to 600 s, preferably 30 to 300 s, at a temperature of 50 to 100° C., preferably 60 to 80° C.

It was surprisingly found that the best results with respect to the mechanical stability of the composite material could be achieved if the glass transition temperature of the cured matrix material is more than 60° C. Therefore, an embodiment of the present invention is preferred wherein the cured matrix material has a glass transition temperature of more than 60° C., preferably 100 to 130° C., determined with DSC according to DIN 11357.

Further, in a preferred embodiment, the matrix material comprises a polyol component and an isocyanate component.

The usual polyol compounds known to one skilled in the art can be used as a polyol component. A plurality of polyfunctional alcohols can be employed in the context of the invention. These polyols should preferably comprise no further functional groups reactive with NCO groups, for example reactive amino groups. The compounds having multiple OH groups can be those which carry terminal OH groups, or can be compounds that comprise lateral OH groups distributed over the chain. The OH groups are those which can react with isocyanates, in particular are primary or secondary OH groups. Polyols having 2 to 10, preferably having 2 to 6 OH groups per molecule, are suitable. Mixtures of different polyols can be used, provided a corresponding average functionality is maintained. The molecular weight is to be from 175 to 3000 g/mol (number-average molecular weight MN measured via GPC), preferably from 200 to 1500 g/mol. Examples of suitable polyols are those based on polyethers, polyalkylenes, polyesters, or polyurethanes. The polyols are preferably present as a mixture in liquid form at room temperature (25° C.).

Suitable polyols are, for example, liquid polyester polyols that can be manufactured by condensation of di- or tricarboxylic acids, for example adipic acid, sebacic acid, and glutaric acid, with low-molecular-weight diols or triols such as ethylene glycol, propylene glycol, diethylene glycol, triethylene glycol, dipropylene glycol, 1,4-butanediol, 1,6-hexanediol, glycerol, or trimethylolpropane. A further group of such polyols to be used are polyesters based on lactones, such as polycaprolactone. Such OH-functional polyesters are known to one skilled in the art and they are commercially obtainable. Polyester polyols containing two or three terminal OH groups are particularly suitable. These polyester polyols are to have a molecular weight of up to 2000 g/mol, preferably in the range from 500 to 1000 g/mol.

Polyester polyols of oleochemical origin can also be used, however. Polyester polyols of this kind can be manufactured, for example, by complete ring opening of epoxidized triglycerides of an at least partly olefinically unsaturated fatty-acid-containing fat mixture with one or more alcohols having 1 to 12 carbon atoms, and subsequent partial transesterification of the triglyceride derivatives to yield alkyl ester polyols having 1 to 12 carbon atoms in the alkyl residue. Examples of such polyols are castor oil or dimer diols. These oleochemical polyols are to have hydroxyl numbers from 50 to 400 mg KOH/g, preferably 100 to 300 mg KOH/g, corresponding to a molecular weight from approximately 250 to 2000 g/mol.

Polycarbonate polyols are further suitable polyester polyols. Polycarbonates can be obtained, for example, by reacting diols, such as propylene glycol, butanediol-1,4 or hexanediol-1,6, diethylene glycol, triethylene glycol, or tetraethylene glycol, or mixtures of two or more thereof, with diaryl carbonates, for example diphenyl carbonate, or phosgene. A further group of polyols to be employed according to the present invention are polylactones, for example polyesters based on ε-caprolactone. Those polyester polyols which contain one or more urethane groups in the molecular chain are also suitable.

Aliphatic polyols can also be used. These are to have a functionality from 2 to 10, in particular from 2 to 6. These can be known polyols such as ethylene glycol, propanediol, butanediol-1,4, pentanediol-1,5, hexanediol-1,6, heptanediol-1,7, octanediol-1,8, 1,10-decanediol, 1,12-dodecanediol, dimer fatty alcohol, glycerol, hexanetriol, glycerol, trimethylolpropane, pentaerythritol, or neopentyl alcohol. So-called sugar alcohols can also be used. Suitable aliphatic alcohols possess a molecular weight from 60 to 400 g/mol. Linear alcohols having 2 to 30 carbon atoms which comprise two to four OH groups are, however, used in particular.

Polyether polyols that are reaction products of low-molecular-weight polyfunctional alcohols with alkylene oxides are a particularly suitable group. The alkylene oxides preferably have 2 to 4 carbon atoms. These can be difunctional or higher-functional polyols; polyols having 2, 3, or 4 OH groups are preferred. Examples are ethylene glycol, propanediol, butanediol, hexanediol, octanediol; polyfunctional alcohols such as glycerol, hexanetriol, trimethylolpropane, pentaerythritol, neopentyl alcohol; sugar alcohols such as mannitol, sorbitol, methyl glycosides. Corresponding aromatic polyols such as resorcinol, hydroquinone, 1,2,2- or 1,1,2-tris(hydroxyphenyl)ethane can also be reacted with the alkylene oxides. Further polyols suitable in the context of the invention are produced by polymerization of tetrahydrofuran (poly-THF). Statistical polymers and/or block copolymers of ethylene oxide and propylene oxide can be employed. Polyether polyols having 2, 3, or 4 OH groups are preferred. Polyether polyols are manufactured in a manner known to one skilled in the art and are commercially obtainable.

Polyoxyethylene or -propylene diols or triols are preferred. The molecular weight of these polyethers can be from approximately 200 to 3000 g/mol, in particular up to 1000 g/mol.

Polyols that contain tertiary amino groups are preferably not contained in the composition. They degrade the application properties. The functionality of the polyol mixture is to be greater than 2.3, in particular from 2.5 to 4. In an embodiment of the invention, the composition is wherein the polyester polyols and/or in particular polyether polyols having an average functionality greater than 2.5 are used as polyols. If the crosslinking density is not sufficient, the crosslinked matrix binding agent is not sufficiently mechanically stable.

The isocyanate component may be employed in monomeric form or in form of oligomers or polymers of said monomeric isocyanate compounds. Polyfunctional isocyanates are suitable as the isocyanate component. The isocyanates preferably contain on average 2 to 5, preferably up to 4 NCO groups. Examples of suitable isocyanates are aromatic isocyanates such as 1,5-naphthylene diisocyanate, 2,4- or 4,4'-diphenylmethane diisocyanate (MDI), xylylene diisocyanate (XDI), m- and p-tetramethylxylylene diisocyanate (TMXDI), isomers of toluene diisocyanate (TDI), di- and tetraalkyldiphenylmethane diisocyanate, 3,3'-dimethyl-diphenyl-4,4'-diisocyanate (TODI) 1,3-phenylene diisocyanate, 1,4-phenylene diisocyanate, 4,4'-dibenzyl diisocyanate; aliphatic isocyanates such as hydrogenated MDI (H12MDI), 1-methyl-2,4-diisocyanatocyclohexane, 1,12-diisocyanatododecane, 1,6-diisocyanato-2,2,4-trimethyl-hexane, 1,6-diisocyanato-2,4,4-trimethylhexane, 1-isocyanatomethyl-3-isocyanato-1,5,5-trimethylcyclohexane (IPDI), tetramethoxybutane-1,4-diisocyanate, butane-1,4-diisocyanate, hexane-1,6-diisocyanate (HDI), dimer fatty acid diisocyanate, dicyclohexylmethane diisocyanate, cyclohexane-1,4-diisocyanate, ethylene diisocyanate, or phthalic acid bis-isocyanatoethyl ester.

Portions of low-molecular-weight prepolymers can also be employed, for example reaction products of MDI or TDI with low-molecular-weight diols, for example ethylene glycol, diethylene glycol, propylene glycol, dipropylene glycol, or triethylene glycol. These prepolymers can be produced by reacting an excess of monomeric polyisocyanate in the presence of diols. The molecular weight of the diols is generally below 1000 g/mol. Monomeric isocyanates can optionally be removed from the reaction product by distillation.

In an embodiment, aromatic diisocyanates are preferred according to the present invention; in another embodiment, mixtures of aliphatic and aromatic isocyanates are preferably employed. In particular, at least 50 mol-% of the NCO groups are to be based on MDI and isomers thereof. In an embodiment, the two-component polyurethane composition is wherein at least 50 mol-% NCO groups from MDI and isomers thereof are contained as isocyanate groups. Liquid isocyanates may be used provided they exhibit a phase incompatibility with the polyols. According to the present invention it is also possible, but not necessary, for the quantity of isocyanate groups to be reduced by reaction to carbodiimides and derivatives thereof, in particular to uretonimines. In an embodiment, the two-component polyurethane composition is wherein the composition contains carbodiimides and/or uretonimines from the aromatic isocyanates. The proportion of reacted NCO groups can be 3 to 25 mol-% of the NCO groups originally present. The mixture of polyisocyanates is preferably to be flowable at room temperature (25° C.). In order to obtain stable compositions, this component is not to contain any constituents that produce reactions which bring about an increase in viscosity under storage conditions.

The two-component polyurethane compositions according to the present invention can furthermore contain adjuvants that preferably are mixed entirely or partly into the polyol component. These are to be understood as substances that as a rule are added in small quantities in order to modify the properties of the composition, for example viscosity, wetting behavior, stability, reaction rate, bubble formation, shelf life, or adhesion, and also to adapt utilization properties to the intended application. Examples of adjuvants are leveling agents, wetting agents, catalysts, aging protectants, dyes, drying agents, resins, and/or waxes.

For example, the composition according to the present invention can additionally contain stabilizers. "Stabilizers" are to be understood for purposes of this invention as antioxidants, UV stabilizers, or hydrolysis stabilizers. Examples thereof are the commercially available sterically hindered phenols and/or thioethers and/or substituted benzotriazoles and/or amines of the hindered amine light stabilizer (HALS) type.

Catalysts can also be employed. The usual organometallic compounds known in polyurethane chemistry are employed as catalysts, for example compounds of iron, titanium, zirconium, aluminum, lead, bismuth, or also in particular tin. It is preferably possible for these catalysts to contain, as a mixture or as a complex and at a molar ratio from 0.25:1 to 2:1, polyhydroxy compounds selected from α-hydroxyketones and/or triphenols having three adjacent OH groups. In particular, 5-, 6-, or 7-ring compounds can be employed as cyclic α-hydroxyketones, and 1-alkyl-substituted 2,3,4- or 3,4,5-OH derivatives can be used as triphenols. These are substances that act as complexing agents with the metal atoms mentioned above. These complexing agents are to have a molar mass below 500 g/mol, or can also be bound to a carrier. Those substances which optionally comprise a further OH group, COOH group, or ester group are particularly suitable as a complexing agent. In the crosslinking reaction, this complexing agent can also react with the reactive composition and can be permanently incorporated into the matrix.

Another group of catalysts is those based on tertiary amines. Linear or cyclic aliphatic amines are suitable, for example, such as methylcyclohexylamine, dimethylbenzylamine, tributylamine, monoethanolamine, triethanolamine, diethylenetriamine, triethylenetetramine, triethylenediamine, guanidine, morpholine, N-methylmorpholine, diazabicyclooctane (DABCO), 1,8-diazabicyclo-(5,4,0)-undecene-7 (DBU), or diazabicyclonones (DBN). The catalyst can be employed in a quantity from 0.01 to approximately 5 wt.-% based on the total weight of the composition.

An embodiment of the two-component polyurethane composition is wherein the tin compounds, in particular tin catalysts having polyhydroxy compounds as complexing agents or tertiary amines, selected from cyclic α-hydroxyketones or 1-alkyl-2,3,4-triphenols, are contained as a catalyst.

A preferred embodiment, the matrix material is a two-component polyurethane composition containing 10 to 80 wt.-% of at least one polyol having an average number-molecular weight from 175 g/mol to 3000 g/mol; 5 to 75 wt.-% of at least one aromatic isocyanate component; and 0 to 15 wt.-% of at least one additive, the composition having an NCO:OH ratio of 2:1 to 1:2. The wt.-% of the components are based on the total weight of the composition and add up to 100 wt.-%.

In an especially preferred embodiment, the composition contains 30 to 70 wt.-% polyols having a functionality above 2.5, in particular polyether polyols and/or polyester polyols, 70 to 30 wt.-% polyisocyanates, in particular having at least 50 mol-% of all isocyanate groups from MDI and isomers thereof, 0.1 to 5 wt.-% additives selected from stabilizers and catalysts, wherein the sum of the constituents is to yield 100%. The mixture is in particular to be free of reactive amine-containing constituents, for example polyols.

In order to improve the mechanical stability and to fine tune the properties of the composite material, the composite material may further comprise reinforcing fibers. Therefore, an embodiment of the present invention is preferred wherein the composite material further comprises a fiber material. Preferably, the composite material is surrounded by fiber material. The fiber material is preferably selected from the group consisting of carbon fibers, glass fibers, natural fibers, aramid fibers and mixtures thereof. It was surprisingly found that introduction of the fibers does not affect the cycle time of the inventive process.

The inventive process allows the incorporation of all types of fibers. Preferably, the fibers are obtained from semi-finished fiber goods. The semi-finished fiber goods may, for example, be weaved, knitted, braided or may be of the non-crimped type.

The fibers are preferably introduced into the mold before insertion of the matrix material. In a preferred embodiment, the core material and the fiber material are combined to a preform before being placed into the mold. The preform may be obtained by common techniques known to the person skilled in the art. For example, the core material and the fiber material may be combined by mechanical fixation or by fixation by chemical materials. The inventive process allows the employment of a variety of materials. Therefore, the chemical material may be chosen to further adapt the mechanical properties of the core material and/or the composite material. In a preferred embodiment, the chemical materials are binder material or adhesive, preferably selected from the group consisting of thermoplastic materials, thermoset materials and mixtures thereof.

In a preferred embodiment, the inventive process comprises the following steps:
a) preparing a preform comprising a core material and a fiber material:
b) Inserting the preform into a mold;
c) closing the mold and applying a vacuum to the mold cavity;
d) injecting the matrix material into the mold;
e) curing the matrix material at a temperature of no more than 100° C., preferably 50 to 100° C., more preferably 60 to 80° C.; and
f) demolding the obtained composite material.

The preform can preferably be prepared by wrapping the fiber material around the core material or by inserting the core material into a tube of the fiber material. The set-up may be fixed mechanically or with the help of a thermoplastic or thermoset binder or adhesive. In a preferred embodiment, the core material is completely covered by the fiber material. In an alternatively preferred embodiment, the core material is only partially covered by the fiber material.

A further object of the present invention is therefore a composite material obtained by the inventive process.

FIG. 1 shows the overall pressure resistance of a PET foam core material having a density of 110 g/l during the inventive process at a temperature of 68° C. As can be seen, a pressure resistance of up to 11 bar could be achieved and sufficient pressure was maintained in the mold after injection of the matrix material for curing. References p1 to p3 refer to the respective pressure sensors whereby sensor p1 is located close to the injection side of the matrix material.

Figure 2:
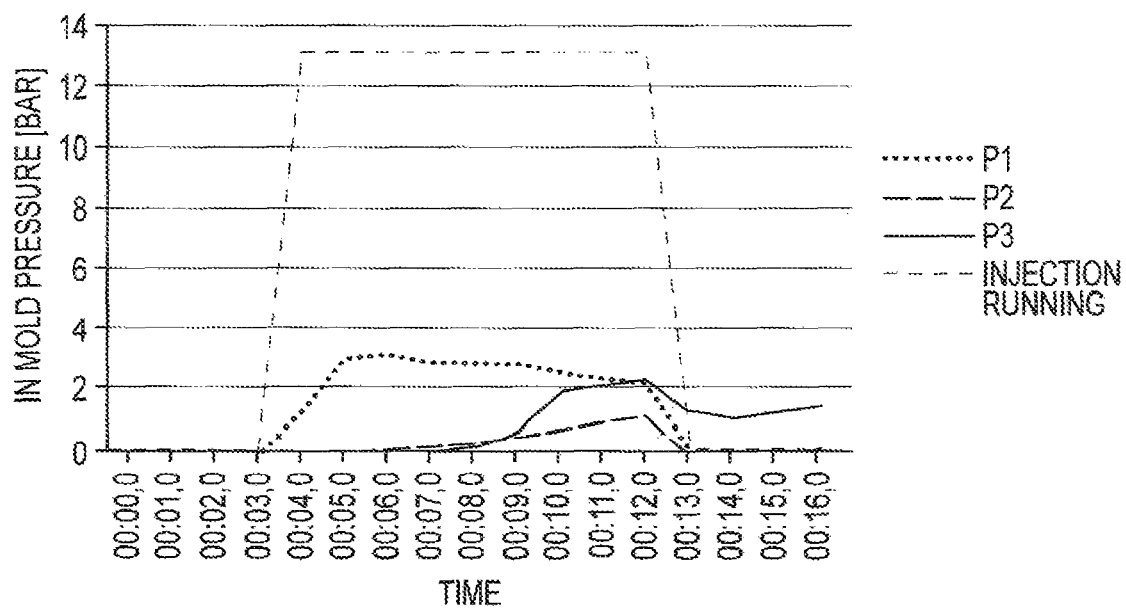
FIG. 2 shows a graph of in-mold pressure in bars versus time of a PET foam core material that is the same PET foam core material as FIG. 1, during a comparative example processing at a temperature slightly exceeding 100° C.

FIG. 2 shows the overall pressure resistance of the same PET foam core material at a temperature slightly exceeding 100° C. It can be seen that the core material collapses, and no pressure is left after the end of the injection.

As can be seen by comparing FIGS. 1 and 2, the inventive process allows for fast cycle times at low temperatures, rendering the process suitable for pressure-sensitive materials which could so far not be employed in conventional HP-RTM processes.

A further object of the present invention is the use of the inventive composite material for the production of automotive parts, for example truck cabins, car seats, hoods etc.; or stiffening structures, for example for electronic equipment such as tablets, TVs, fridges, computers, drones and the like.

A further object of the present invention is an apparatus for carrying out the inventive process, the apparatus comprising a mold cavity and means for injecting a liquid material into the mold cavity.

The present invention can be realized by employment of a specific matrix material. Therefore, a further object of the present invention is the use of a two-component polyurethane composition containing 10 to 80 wt.-% of at least one polyol having an average number-molecular weight from 175 g/mol to 3000 g/mol; 5 to 75 wt.-% of at least one aromatic isocyanate component; and 0 to 15 wt.-% of at least one additive, the composition having an NCO:OH ratio of 2:1 to 1:2, the wt.-% of the components being based on the total weight of the composition and adding up to 100 wt.-%, for the production of composite materials, preferably via the inventive process. Preferably, the composition is used for the production of sandwich-structured composite materials containing a foam material as the core layer.

In a preferred embodiment, the composition for use in the production of composite materials comprises 30 to 70 wt.-% polyols having a functionality above 2.5, in particular polyether polyols and/or polyester polyols, 70 to 30 wt.-% polyisocyanates, in particular having at least 50 mol-% of all isocyanate groups from MDI and isomers thereof, 0.1 to 5 wt.-% additives selected from stabilizers and catalysts, wherein the sum of the constituents is to yield 100%.

What is claimed is:

1. A process for production of a composite material comprising steps of:
    A) placing a foam core material having a density of 60 to 400 g/l inside a mold,
    B) introducing a liquid matrix material, having a viscosity of 20 to 3000 mPas, measured according to EN ISO 2555 at 20 to 40° C., into the mold at a pressure in a range of 0.2 to 2.5 MPa and a speed of 15 to 200 g/s; and
    C) curing the liquid matrix material in the mold, wherein curing of the liquid matrix material is affected at a temperature of no more than 100° C.

2. The process according to claim 1 wherein the curing of the liquid matrix material is affected at a temperature of 60 to 80° C.

3. The process according to claim 1, wherein the liquid matrix material has a viscosity of 20 to 1000 mPas, measured according to EN ISO 2555 at 20 to 40° C.

4. The process according to claim 1, wherein the liquid matrix material comprises a polyol component and an isocyanate component.

5. The process according to claim 1, wherein the liquid matrix material is a two-component polyurethane composition comprising 10 to 80 wt.-% of at least one polyol having an average number-molecular weight from 200 g/mol to 3000 g/mol; 5 to 70 wt.-% of at least one aromatic polyisocyanate; and 0 to 15 wt.-% of at least one additive; each wt.-% being based on the total weight of the composition, respectively; and wherein the composition has an NCO:OH ratio in a range of from 2:1 to 1:2.

6. The process according to claim 1, wherein the liquid matrix material is injected into the mold with a speed of 15 to 200 g/s.

7. The process according to claim 1, wherein the composite material further comprises a fiber material.

8. The process according to claim 7, wherein the core material and the fiber material are combined into a preform before being placed in the mold.

9. The process according to claim 1, wherein the liquid matrix material comprises a two-component polyurethane composition containing 10 to 80 wt.-% of at least one polyol having an average number-molecular weight from 175 g/mol to 3000 g/mol; 5 to 75 wt.-% of at least one aromatic isocyanate component; and 0 to 15 wt.-% of at least one additive, the composition having an NCO:OH ratio of 2:1 to 1:2, the wt.-% of the components being based on the total weight of the composition and adding up to 100 wt.-%; and
    the temperature of the curing step e) is in a range of 50 to 100° C.

10. The process according to claim 9, wherein the at least one polyol is comprised of 30 to 70 wt.-% polyether polyols and/or polyester polyols having a functionality greater than 2.5; the at least one aromatic isocyanate component comprises 70 to 30 wt.-% polyisocyanates, optionally having at least 50 mol-% of all isocyanate groups from MDI and isomers thereof; and the at least one additive is present and comprises 0.1 to 5 wt.-% additives selected from stabilizers and catalysts; and
    the temperature of the curing step e) is in the range of 60 to 80° C.

* * * * *